Patented Feb. 28, 1933

1,899,184

UNITED STATES PATENT OFFICE

MARTIN DE SIMÓ, OF BERKELEY, CALIFORNIA, ASSIGNOR TO SHELL DEVELOPMENT COMPANY, OF SAN FRANCISCO, CALIFORNIA, A CORPORATION OF DELAWARE

PRODUCING HYDROGEN AND CARBON MONOXIDE

No Drawing.    Application filed March 24, 1930.  Serial No. 438,633.

This invention relates to the production of a mixture of hydrogen and carbon monoxide from hydrocarbons, particularly from methane or from natural gas, and consists in oxidizing the hydrocarbons with an easily reducible metal oxide, such as zinc oxide.

Other features and advantages of my invention will appear from the following description. It will be understood that I desire to cover broadly the principle of my invention and not limit myself unnecessarily to particular illustrations and details mentioned hereafter, and that accordingly the appended claims are to be granted the scope and range of equivalents consistent with the prior art.

A mixture of hydrogen and carbon monoxide is useful for different purposes, as for the production of methanol, or the carbon monoxide may be reacted upon with steam to produce a further quantity of hydrogen if only hydrogen is desired. Such mixture of hydrogen and carbon monoxide can be produced from methane or from natural gas by oxidation with oxygen or air; a temperature of about 1200° C. is necessary to avoid the formation of substantial quantities of carbon dioxide and carbon, reducing the production of carbon monoxide. This high temperature results in rapid deterioration of the furnaces, besides many other disadvantages. The use of air for this high temperature oxidation further has the disadvantage that much heat is consumed to raise the temperature of the large quantity of inert nitrogen contained in the air, to 1200° C. while the reaction products leaving the apparatus are diluted with this nitrogen. The use of pure oxygen while avoiding the dilution increases on the other hand the cost of the process considerably.

I have found that the oxidation of methane, natural gas, and other hydrocarbons to produce substantially a mixture of hydrogen and carbon monoxide with very little accompanying carbon dioxide and negligible deposition of carbon can be effected at comparatively low temperatures by oxidation with easily reducible metal oxides, instead of with air or oxygen. Any easily reducible metal oxide may be employed and I have used successfully, amongst others, the oxides of iron, chromium, copper, nickel, manganese and zinc. I have found it preferable to use zinc oxide as it possesses certain advantages not inherent in other reducible metal oxides. For example, the other oxides lend themselves more readily to the complete oxidation of the hydrocarbon gases to carbon dioxide and water at the customary oxidation temperatures or require somewhat higher temperatures for their reduction so that their use for the oxidation of hydrocarbons is not economical, in a practical manner of speaking, when compared to that of zinc oxide. Zinc oxide, if used in the right proportions, oxidizes the hydrocarbon gases almost completely to carbon monoxide and hydrogen. The process operates satisfactorily at temperatures of 950°–1000° C. without appreciable production of carbon dioxide. I have found that molecular proportions of the reactants are most suitable as evidenced by the reaction of zinc oxide with methane as follows:

$$CH_4 + ZnO \rightarrow CO + 2H_2 + Zn$$

An excess of oxide induces increased formation of $CO_2$.

The contacting of the gas and metal oxide may be effected in any suitable manner, as by passing the gas over the oxide, or by injecting the gas together with the powdered oxide into the heated furnace. The gas may be preheated.

As an example of my process and of the results obtained, without limiting my invention thereby, I may state that in one instance natural gas of the following composition:

|  | Per cent |
|---|---|
| $CH_4$ | 86 |
| $C_2H_6$ | 10 |
| $C_3H_8$ and higher | 4 | was passed over zinc oxide supported in a tube heated to a temperature of 952° C. Upon analysis the collected exit gas was found to have the following composition:

|  | Per cent |
|---|---|
| $H_2$ | 59.4 |
| CO | 26.7 |
| $CO_2$ | 1.4 |
| $N_2$ | 5.5 |
| $CH_4$ | 5.5 |

When natural gas of the same composition as that previously given was passed over zinc oxide at 992° C., the collected exit gas was found to have the following composition:

|  | Per cent |
|---|---|
| $H_2$ | 60.8 |
| CO | 27.4 |
| $CO_2$ | 4.0 |
| $N_2$ | 2.6 |
| $CH_4$ | 2.6 |

In the two examples given, the conversion of natural gas to CO and hydrogen was about 80% and 87% in the respective examples. I have found that by increasing the temperature slightly the conversion percentage can be still further increased.

The gaseous products include the zinc as vapor; they may be cooled to the condensation point of zinc, which then is separated. The zinc may be reoxidized in a separate furnace in a current of air, and the oxide returned to the reaction chamber in a cyclic process.

It will be clear that my process avoids many of the disadvantages of the usual oxidation with air: the temperature is much lower, far less gas has to be heated, the reaction products are not diluted with nitrogen, nearly complete oxidation to hydrogen and carbon monoxide may be obtained, furnace construction is cheaper and deterioration is less.

I claim as my invention:

1. The method of oxidizing a paraffin hydrocarbon to substantially hydrogen and carbon monoxide comprising reacting the hydrocarbon with a metallic oxide in substantially molecular proportions in the absence of steam at a temperature at which the oxide is easily reduced.

2. The method of oxidizing a paraffin hydrocarbon to substantially hydrogen and carbon monoxide comprising reacting the hydrocarbon with a metallic oxide in substantially molecular proportions in the absence of steam at about 950° to 1000° C. at which temperature the oxide is easily reduced.

3. The method of oxidizing a paraffin hydrocarbon to substantially hydrogen and carbon monoxide comprising reacting the hydrocarbon with zinc oxide in substantially molecular proportions in the absence of steam.

4. The method of oxidizing a paraffin hydrocarbon to substantially hydrogen and carbon monoxide comprising reacting the hydrocarbon with zinc oxide in substantially molecular proportions in the absence of steam at about 950° to 1000° C.

5. The continuous method of oxidizing paraffin hydrocarbons to substantially hydrogen and carbon monoxide comprising reacting the hydrocarbon with zinc oxide in substantially molecular proportions in the absence of steam at about 950° to 1000° C., removing the gases formed, regenerating the zinc oxide and recycling it in the process.

6. The method of forming carbon monoxide and hydrogen from a hydrocarbon gas comprising reacting said gas with a reducible metallic oxide in substantially molecular proportions at an elevated temperature to convert said gas into substantially only carbon monoxide and hydrogen and collecting said gases.

7. The method of oxidizing a hydrocarbon gas comprising reacting said gas with a metallic oxide in substantially molecular proportions, at an elevated temperature to form substantially only carbon monoxide and hydrogen without cracking of said hydrocarbon, and collecting the carbon monoxide and the hydrogen.

8. The method of oxidizing a hydrocarbon gas at a high temperature without cracking or deposition of carbon comprising reacting said gas with a hot reducible metallic oxide in substantially molecular proportions.

9. The method of oxidizing a hydrocarbon gas at a high temperature without cracking or deposition of carbon comprising reacting said gas with a hot reducible metallic oxide in substantially molecular proportions.

10. The method of obtaining hydrogen from a hydrocarbon without the substantial formation of carbon comprising reacting the hydrocarbon with a reducible metallic oxide in substantially molecular proportions at about 950–1000° C. to form substantially only carbon monoxide and hydrogen.

11. The method of obtaining hydrogen from a hydrocarbon without the substantial formation of carbon comprising reacting the hydrocarbon with zinc oxide in substantially molecular proportions to form substantially only carbon monoxide and hydrogen.

12. The method of obtaining hydrogen from a hydrocarbon without the substantial formation of carbon comprising reacting the hydrocarbon with zinc oxide in substantially molecular proportions to form substantially only carbon monoxide and hydrogen at a temperature of about 950–1000° C.

13. The method of oxidizing natural gas to substantially hydrogen and carbon monoxide comprising reacting said gas with a metallic oxide in substantially molecular proportions at a temperature at which the oxide is easily reduced.

14. The method of oxidizing natural gas to substantially hydrogen and carbon monoxide comprising reacting said gas with a metallic oxide in substantially molecular proportions at about 950–1000° C. at which temperature the oxide is easily reduced.

15. The method of oxidizing natural gas to substantially hydrogen and carbon monoxide comprising reacting said gas with zinc oxide in substantially molecular proportions.

16. The method of oxidizing natural gas to substantially hydrogen and carbon monoxide comprising reacting said gas with zinc oxide in substantially molecular proportions at about 950–1000° C.

17. The method of oxidizing methane to substantially hydrogen and carbon monoxide comprising reacting said gas with a metallic oxide in substantially molecular proportions at a temperature at which the oxide is easily reduced.

18. The method of oxidizing methane to substantially hydrogen and carbon monoxide comprising reacting said gas with a metallic oxide in substantially molecular proportions at about 950–1000° C. at which temperature the oxide is easily reduced.

19. The method of oxidizing methane to substantially hydrogen and carbon monoxide comprising reacting said gas with zinc oxide in substantially molecular proportions.

20. The method of oxidizing methane to substantially hydrogen and carbon monoxide comprising reacting gas with zinc oxide in substantially molecular proportions at about 950–1000° C.

21. The method of oxidizing a mixture of hydrocarbons to substantially hydrogen and carbon monoxide comprising reacting the mixture with a metallic oxide of the fourth row of the periodic table in substantially molecular proportions at a temperature at which the metallic oxide is easily reduced.

22. The method of oxidizing natural gas to substantially hydrogen and carbon monoxide comprising reacting natural gas with a metallic oxide of the fourth row of the periodic table in substantially molecular proportions at a temperature at which the metallic oxide is easily reduced.

23. The method of oxidizing methane to substantially hydrogen and carbon monoxide comprising reacting methane with a metallic oxide of the fourth row of the periodic table in substantially molecular proportions at a temperature at which the metallic oxide is easily reduced.

24. The continuous method of oxidizing hydrocarbons to substantially hydrogen and carbon monoxide comprising reacting the hydrocarbon with a metallic oxide in substantially molecular proportions at a temperature at which the oxide is easily reduced, removing the gases formed, regenerating the metallic oxide and recycling it in the process.

25. The continuous method of oxidizing natural gas to substantially hydrogen and carbon monoxide comprising reacting natural gas with a metallic oxide in substantially molecular proportions at a temperature at which the oxide is easily reduced, removing the gases formed, regenerating the metallic oxide and recycling it in the process.

26. The continuous method of oxidizing methane to substantially hydrogen and carbon monoxide comprising reacting methane with a metallic oxide in substantially molecular proportions at a temperature at which the oxide is easily reduced, removing the gases formed, regenerating the metallic oxide and recycling it in the process.

In testimony whereof, I have hereunto set my hand.

MARTIN de SIMÓ.